No. 705,671. Patented July 29, 1902.
A. HERSCHMANN.
DIFFERENTIAL GEAR FOR SELF PROPELLING VEHICLES.
(Application filed June 21, 1901.)
(No Model.) 2 Sheets—Sheet 2.
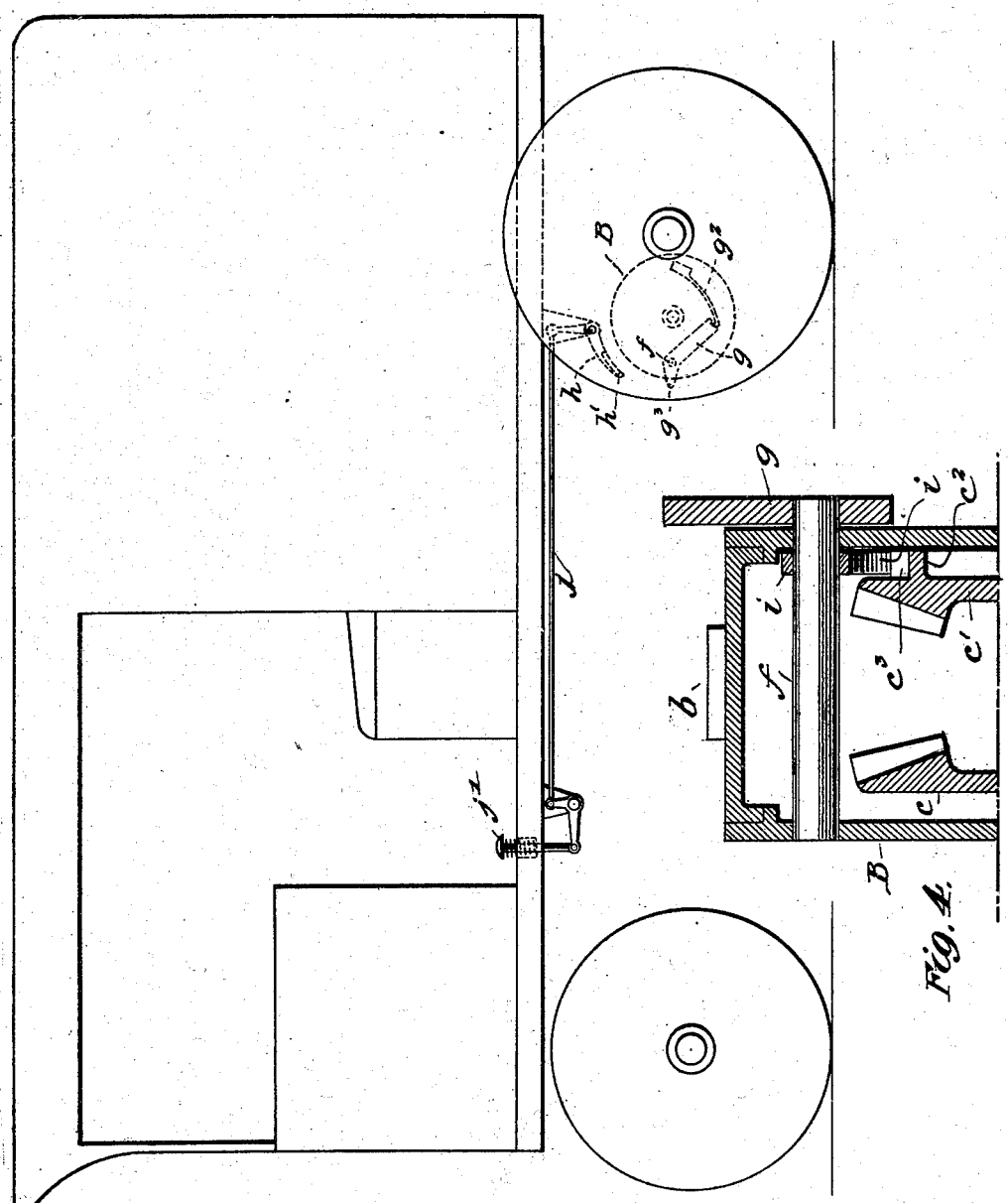

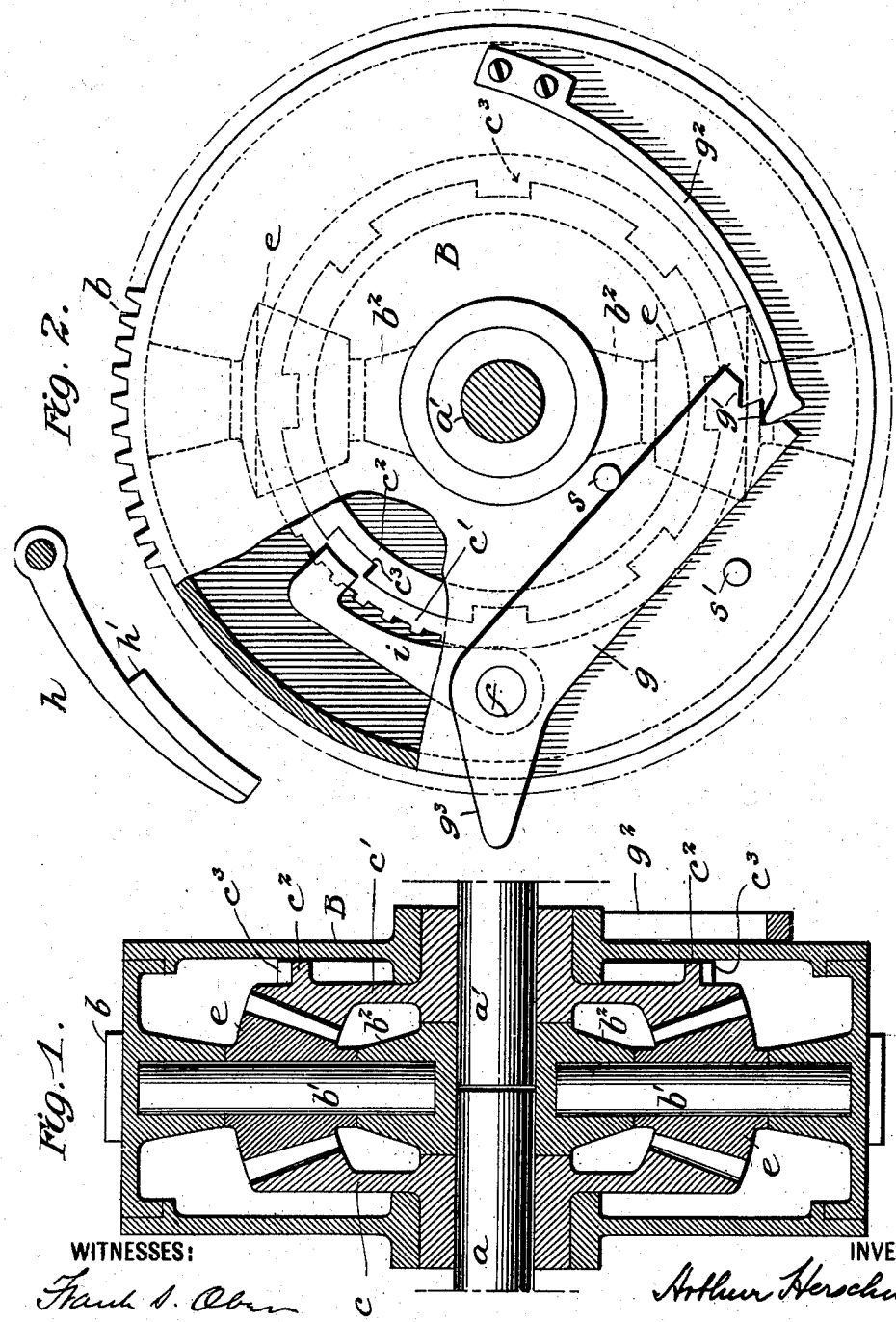

UNITED STATES PATENT OFFICE.

ARTHUR HERSCHMANN, OF NEW YORK, N. Y.

DIFFERENTIAL GEAR FOR SELF-PROPELLING VEHICLES.

SPECIFICATION forming part of Letters Patent No. 705,671, dated July 29, 1902.

Application filed June 21, 1901. Serial No. 65,387. (No model.)

*To all whom it may concern:*

Be it known that I, ARTHUR HERSCHMANN, a subject of the Emperor of Austria-Hungary, residing at the city of New York, in the borough of Manhattan and State of New York, have invented certain new and useful Improvements in Differential Gear for Self-Propelling Vehicles, of which the following is a full, clear, and exact description.

This invention relates to compensating or differential gear for self-propelling vehicles, the object of the invention being to provide means whereby when the necessity arises for rotating both traction-wheels at the same speed, notwithstanding the fact that they may be acting under different tractive forces, the compensating gear can be locked so that the two parts of the shaft may travel together. It sometimes happens that with one traction-wheel of a loaded truck in a gutter or depression of the road and the incline of the vehicle throwing the load toward the low wheel and away from the higher wheel and the latter possibly resting upon a slippery portion of the road the full rotary effect of the motor is taken up by the lightly-loaded wheel, which will spin around, while the other wheel will remain stationary, thus preventing the vehicle from moving. Under such conditions it is desirable to lock the compensating-gear or throw it out of action, so that the two parts of the shaft which drives the traction-wheels are connected together as one solid shaft and the rotary effect and power of the motor applied equally to both traction-wheels, which will result in moving the vehicle under the conditions named.

The invention will be described with reference to the accompanying drawings, in which—

Figure 1 is a sectional view of an ordinary form of compensating gear having my improved device applied thereto. Fig. 2 is a side elevation of the same, and Fig. 3 illustrates the system of levers for operating the lock. Fig. 4 is a section of a part of the compensating gear and lock.

The two parts of the driving-shaft are indicated by $a$ and $a'$, respectively. Their abutting ends are surrounded by a common form of compensating or differential gear used for the purpose of allowing one wheel to turn at a different speed from the other. This gear consists of a drum B, loosely mounted on the hubs of two bevel gear-wheels $c$ and $c'$, which are keyed to the respective shafts and face each other inside of the drum. The drum carries on its periphery the gear-teeth $b$, with which the engine-pinion engages, and is provided with one or more radial shafts $b'$ in the nature of spokes which are fixed at their outer ends in suitable bosses in the rim of the drum and at their inner ends in a hub $b^2$, surrounding the abutting ends of the shaft. On these radial shafts are loosely mounted bevel-pinions $e$, each of which gears with both of the bevel-gears $c$ and $c'$. In this construction, which is quite ordinary, as before stated, the two parts of the shaft will rotate at the same speed when the power is applied to either one of them, provided the tractive force of both wheels is the same; but when the tractive force differs one wheel is allowed to turn faster than the other, the difference in motion being provided by the rotation of the pinions $e$ on their shafts, allowing one of the gears $c$ to move ahead of the other.

In accordance with my invention I provide one of the gears $c$ or $c'$ with a flange $c^2$, in which are formed at intervals the notches $c^3$. At a convenient point in the drum I locate a shaft $f$, having its bearings in the sides of the drum, preferably near the periphery, and extend one end of the shaft outside of the drum, where it is provided with a lever $g$, rigidly secured thereto and having two notches $g'$ in its outer end. This lever is in a plane parallel to the side of the drum and close to it and is adapted to rest against either of two stop-pins $s$ and $s'$ and be held in those positions by a spring $g^2$, the end of which engages one or the other of the notches $g'$. Inside of the drum the shaft $f$ carries a pawl or dog $i$, which is located in the plane of the flange $c^2$. This pawl being also tight on the shaft is adapted to be thrown toward and away from the flange by rocking the shaft, which motion will cause it to engage or disengage with one of the notches in the flange of the gear-wheel. For obtaining this movement of the dog I provide the lever $g$ with an extension $g^3$ projecting beyond the periphery of the drum a slight distance, and on a suitable part of the frame of the vehicle I pivot a lever $h$, carrying a stop-block $h'$, adapted to be thrown into and out of the path of the extension $g^3$ by means of a system of levers $j$, operated by the driver of the vehicle by stamping on a footpiece $j'$.

The operation of the device is as follows: When the driver finds that the vehicle is stalled by reason of one of the traction-wheels absorbing all of the rotary effect of the engine or motor due to one wheel being in a rut and the other on slippery ground or to any other cause, he will slow down the engine and then stamp on the footpiece $j'$, and thus throw the block $h'$ toward the drum and into the path of the projection $g^3$. The projection will then strike the block, the lever $g$ will be tilted, and the pawl $i$ carried against the flange $c^2$ and into one of its notches, the pawl being held in this notch by the spring $g^2$ engaging with the lever $g$. The drum, the wheels $c$ and $c'$, and the pinions $e$ are then all locked together. In order to disengage the block $h'$ from the projection $g^3$, the engine must be reversed and given a partial turn, whereupon a spring connected with the levers $j$ will return the block to its normal position. Then the engine is again reversed and all parts, including both sections of the shaft, are driven together and the vehicle is propelled out of its stalled position. When the conditions are again normal, the engine is reversed, and the block $h'$ again thrown toward the drum to allow the projection $g^3$ to strike its opposite side. This reverses the position of lever $g$ and withdraws the pawl from the notch in flange $c^2$ and allows the compensating gear to perform its usual function, after which the engine can again be sent ahead.

Having described my invention, I claim—

1. In a vehicle, the combination of a shaft in two parts, two traction-wheels driven respectively by the said parts, a compensating gear interposed between the parts, means for locking the parts of the compensating gear together to thereby destroy its compensating function and means for controlling said locking means from a distance.

2. The combination of a shaft in two parts, a bevel-gear fixed upon each part, a concentric drum adapted to be driven, a radial shaft supported by said drum, a pinion on said radial shaft said pinion being in mesh with both of said bevel-gears, one of said bevel-gears having a notched flange, a pawl carried by the drum and means for causing said pawl to engage and disengage the notches in said gear.

3. The combination of a shaft in two parts, a bevel-gear fixed upon each part, a concentric drum adapted to be driven, a radial shaft supported by said drum, a pinion on said radial shaft said pinion being in mesh with both of said bevel-gears, one of said bevel-gears having a notched flange, a shaft mounted in said drum, a pawl on said shaft adapted to engage with said flange, a lever on said shaft and means for throwing the lever, for the purpose set forth.

In witness whereof I subscribe my signature in presence of two witnesses.

ARTHUR HERSCHMANN.

Witnesses:
 WM. A. ROSENBAUM,
 WALDO M. CHAPIN.